US010140806B2

(12) United States Patent
Pececnik

(10) Patent No.: US 10,140,806 B2
(45) Date of Patent: Nov. 27, 2018

(54) WIDE AREA ROULETTE DISPLAY SYSTEM WITH GROUP ARENA PLAY

(71) Applicant: Interblock D.D., Menges (SI)

(72) Inventor: Joze Pececnik, Smarca (SI)

(73) Assignee: INTERBLOCK D.D., Menges (SI)

( * ) Notice: Subject to any disclaimer, the term of this patent is extended or adjusted under 35 U.S.C. 154(b) by 0 days.

(21) Appl. No.: 15/206,269

(22) Filed: Jul. 9, 2016

(65) Prior Publication Data

US 2018/0012441 A1 Jan. 11, 2018

Related U.S. Application Data

(63) Continuation of application No. 15/168,883, filed on May 31, 2016.

(51) Int. Cl.
*G06F 17/00* (2006.01)
*G07F 17/32* (2006.01)

(52) U.S. Cl.
CPC ........ *G07F 17/322* (2013.01); *G07F 17/3209* (2013.01); *G07F 17/3211* (2013.01); *G07F 17/3244* (2013.01); *G07F 17/3293* (2013.01)

(58) Field of Classification Search
None
See application file for complete search history.

(56) References Cited

U.S. PATENT DOCUMENTS

| | | | | | |
|---|---|---|---|---|---|
| D378,930 | S * | 4/1997 | Nobata | D21/369 | |
| 5,857,910 | A * | 1/1999 | Watanabe | A63F 3/081 | 273/138.2 |
| 5,879,235 | A * | 3/1999 | Kaneko | A63F 5/0005 | 273/142 R |
| 6,824,463 | B1 * | 11/2004 | Yamaguchi | A63F 5/02 | 273/142 R |
| D537,886 | S * | 3/2007 | Kaminkow | D21/369 | |
| D548,802 | S * | 8/2007 | Damjan | D21/375 | |
| D591,800 | S * | 5/2009 | Hsu | D21/369 | |
| D592,708 | S * | 5/2009 | Hsu | D21/369 | |
| 8,123,612 | B2 * | 2/2012 | Yoshizawa | G07F 17/3211 | 463/20 |
| 8,167,717 | B2 * | 5/2012 | Kato | G07F 17/32 | 463/30 |
| 8,189,814 | B2 * | 5/2012 | Okada | G07F 17/32 | 273/148 B |
| 8,562,412 | B2 * | 10/2013 | Matsuno | G07F 17/3211 | 273/142 E |
| 8,602,877 | B2 * | 12/2013 | Carpenter | G07F 17/32 | 463/16 |

(Continued)

*Primary Examiner* — Paul A D'Agostino
(74) *Attorney, Agent, or Firm* — Baker & Hostetler LLP

(57) ABSTRACT

A system enables group play for table games of craps and/or roulette comprising. The gaming table surface enables play of craps or roulette. A processor receives event outcomes from outcomes on the gaming table surface from game play. Multiple player input terminals are distributed around the gaming table surface in an arc including of more than 200 degrees. The multiple player input terminals are in two-way communication with the processor. An elevated display system is supported above and around the gaming table surface. The elevated display system shows a dynamic rendition of craps or roulette game play including at least a display of event outcomes from play of craps or roulette on which the wagers are resolved by the processor.

17 Claims, 4 Drawing Sheets

(56) References Cited

U.S. PATENT DOCUMENTS

| | | | | |
|---|---|---|---|---|
| 8,628,407 | B2 * | 1/2014 | Arezina | G07F 17/32 463/16 |
| D707,302 | S * | 6/2014 | Inoue | D21/369 |
| 8,851,969 | B2 * | 10/2014 | Kato | G07F 17/32 463/20 |
| 8,888,098 | B2 * | 11/2014 | Kogure | A63F 5/00 273/138.1 |
| 9,183,697 | B2 * | 11/2015 | Kido | G07F 17/3211 |
| 9,704,334 | B2 * | 7/2017 | Inoue | G07F 17/3216 |
| 2003/0148804 | A1 * | 8/2003 | Ikeya | G07F 17/32 463/16 |
| 2005/0159205 | A1 * | 7/2005 | Kukita | A63F 3/0645 463/17 |
| 2005/0239536 | A1 * | 10/2005 | Ogiwara | G07F 17/32 463/17 |
| 2006/0009283 | A1 * | 1/2006 | Englman | G07F 17/32 463/29 |
| 2006/0046821 | A1 * | 3/2006 | Kaminkow | G07F 17/32 463/16 |
| 2006/0166731 | A1 * | 7/2006 | Yoshimi | G07F 17/3211 463/20 |
| 2006/0205470 | A1 * | 9/2006 | Parent | A63F 5/00 463/16 |
| 2006/0252521 | A1 * | 11/2006 | Gururajan | A63F 1/00 463/29 |
| 2007/0265056 | A1 * | 11/2007 | Yoshizawa | A63F 5/0005 463/17 |
| 2008/0176657 | A1 * | 7/2008 | Okada | G07F 17/32 463/42 |
| 2008/0207308 | A1 * | 8/2008 | Yoshizawa | G07F 17/3211 463/25 |
| 2009/0023491 | A1 * | 1/2009 | Ikeya | G07F 17/32 463/20 |
| 2009/0104961 | A1 * | 4/2009 | Hamada | G07F 17/32 463/16 |
| 2009/0176548 | A1 * | 7/2009 | Nakamura | G07F 17/32 463/17 |
| 2009/0181748 | A1 * | 7/2009 | Nagano | G07F 17/32 463/17 |
| 2009/0189351 | A1 * | 7/2009 | Baerlocher | G07F 17/32 273/309 |
| 2009/0270157 | A1 * | 10/2009 | Christensen | G07F 17/32 463/20 |
| 2009/0280904 | A1 * | 11/2009 | Nicely | G07F 17/3211 463/40 |
| 2009/0318207 | A1 * | 12/2009 | Okuaki | G07F 17/3297 463/2 |
| 2010/0041464 | A1 * | 2/2010 | Arezina | G07F 17/32 463/22 |
| 2010/0102507 | A1 * | 4/2010 | Bontempo | A63F 5/00 273/142 R |
| 2010/0227662 | A1 * | 9/2010 | Speer, II | G07F 17/32 463/16 |
| 2010/0291993 | A1 * | 11/2010 | Gagner | 463/25 |
| 2010/0331085 | A1 * | 12/2010 | Nagano | G07F 17/3211 463/31 |
| 2011/0006477 | A1 * | 1/2011 | Miller | A63F 5/00 273/142 R |
| 2011/0306406 | A1 * | 12/2011 | Okuaki | G07C 15/001 463/25 |
| 2012/0077587 | A1 * | 3/2012 | Apirian | G07F 17/3276 463/31 |
| 2012/0077588 | A1 * | 3/2012 | Apirian | G07F 17/3276 463/31 |
| 2012/0122571 | A1 * | 5/2012 | DeSimone | G07F 17/3211 463/31 |
| 2013/0059638 | A1 * | 3/2013 | Nicely | G07F 17/322 463/17 |

* cited by examiner

WIDE AREA ROULETTE DISPLAY SYSTEM WITH GROUP ARENA PLAY

CROSS REFERENCE TO RELATED APPLICATIONS

This application is a continuation of U.S. patent application Ser. No. 15/168,883, filed May 31, 2016, the contents of which is incorporated herein by reference in its entirety.

BACKGROUND OF THE INVENTION

1. Field of the Invention

The present invention relates to the field of gaming, particularly the field of roulette or craps gaming, and more particularly to the field of group gaming play as in a pit or arena.

2. Background of the Art

Roulette and craps are the most successful large table games that allow for large numbers (e.g., more than 8) of players at a single table. Card games and even big wheel have even less available space for players. Even with automated systems for these large area table games (specifically craps and preferably roulette), it would be more efficient to have players in the casino interact with the games. The use of hand-held devices has not proved to provide the quality and ambience of group play that is a desirable aspect of these large-table games.

Numerous systems have been used to automate games to speed up play and remove table personnel to increase revenues. The following descriptions some of include those technical advances in large-table gaming systems.

Published US Patent Application Serial No. 20050282618 (O'Halloran) discloses a gaming machine system for a communal slot machine game. The system includes processing means for determining a result of a slot machine game, a communal display device (1) for displaying the result and a plurality of terminals (2-11) linked via communication means to the processing means. A number of the terminals (2-6) are physically located proximate the communal display device (1) so that players of these terminals can see the result on the communal display device (1). A number of the terminals are located remote from the communal display device (1). These remote terminals (7-11) are provided with individual displays to allow respective players to see the result. In playing a communal slot machine game with the system, the outcome at each of the terminals is solely dependent on the single, communal result determined by the processing means.

Published US Patent Application Serial No. 2008011376 (O'Halloran) discloses a gaming table is used with the at least one game piece to determine a random outcome. At least two player interface wagering systems with a visual display are provided on each player interface wagering system. Each player interface wagering system is in communication link with a game server that processes game data and determines wager outcomes. Each player interface wagering system has at least two selectable wagering input displays that may be separately selected and displayed by a player wagering at each player interface. Each of the at least two selectable wagering input displays identifies different sets of wagers that may be placed by the player on the random outcomes of the wagering game.

Other gaming systems, mainly employing limited range of visibility (for example 180 degree viewing angle) systems such as forward screens or top boxes.

Published US Patent Application Serial No. 20150024818 (Chun) describes an electronic gaming table for hosting live table games involving wagers can include a physical surface, a dealer station, a plurality of player terminals, and a table controller. The physical surface permits the play of live table games with a live dealer and physical game components. The dealer station is situated proximate the physical surface and allows the presence of a live dealer who facilitates game play. Player terminals allow live players to play the games and include player terminal processors coupled to player interfaces having input and output devices. A table controller coupled to the player terminals controls various table functions and administers a live table game pitting a first hand against a second hand. Each of multiple live players can make different live game decisions independently based upon the same second hand, wherein resolution of the game varies by player depending upon the different live game decisions.

Published US Patent Application Serial No. 20140342825 (Schrementi) discloses a system and apparatus for mounting an overhead display device to gaming machines. The system and apparatus featuring mounting elements securable to a display device at a selected distance and mounting hardpoints on one or a plurality of gaming machines. The hardpoints having a recess with a size and shape corresponding to that of the mounting elements. Wherein the display is securable to gaming machines in an overhead configuration when the mounting elements are secured to hardpoints and where the distance between the mounting elements corresponds to the distance between the hardpoints to which they are respectively secured.

Published US Patent Application Serial No. 20120122571 (DeSimone) discloses a top box wheel assembly and method wherein a flat panel display is mounted on a rectangular shaped cabinet top box structure and a circular bezel structure overlays the flat panel display such that a wheel-shaped display area is provided. The circular bezel structure also is shown to include a rectangular cutout base to also provide a rectangular-shaped display area. The circular bezel structure is further shown to include a circular pattern of LEDs which may be operated synchronously or quasi-synchronously with the wheel-shaped display area on which a rotating wheel may be displayed together with an indicator.

Published US Patent Application Serial No. 20120083331 (Carpenter) discloses a convertible in-revenue and out-of-revenue gaming system is disclosed that includes a server connected to automatically convert operating modes and control in-revenue and out-of-revenue operation of one or more banks of gaming machines. Additionally disclosed are gaming machines with video cameras connected to provide live video feed to one or more displays, such as during tournament play when live video feed of the players and the player tournament positions may be driven in real-time to an overhead display by the server operating in a tournament controller mode.

Published US Patent Application Serial No. 20010041464 (Arezina) discloses a gaming system for playing a wagering game is provided which includes a plurality of gaming machines (10*a*-10*f*) configured to play a wagering game and to participate in a community-event. A movable member (99) is disposed substantially adjacent to the plurality of gaming machines and is configured to move relative to the plurality of gaining machines from a first position to a second position during a community-event (S500) in response to a single triggering event (S505). The movable member is moved relative to the plurality of gaming machines during a community-event to reveal at least one community-event outcome for the community-event (S510)

Published US Patent Application Serial No. 20090275411 (Kisenwether) discloses techniques described for providing group play bonus events with multiple game devices. A group play bonus event is initiated based in part on the occurrence of a group play bonus event trigger. End users of game devices participate in an initiated group play bonus event if the end users qualify to participate in the group play bonus event at the time of the occurrence of the group play bonus event trigger. In some situations, group play bonus events are initiated by the occurrence of a randomly generated group play bonus event trigger.

U.S. Pat. No. 9,183,695 (Allen) discloses techniques for controlling wagering game environments. In one embodiment, a computer-implemented method for controlling a casino wagering game environment includes determining a plurality of zones in the casino wagering game environment, wherein the zones include one or more wagering game machines. The method can also include presenting wagering games on the wagering game machines in the wagering game environment, and detecting an event in the wagering game environment, the event triggering a bonus game for which a plurality of players have a possibility of winning an award. The method can also include determining one or more of the zones in which to present media associated with the bonus game, and presenting, in the one or more zones, the media associated with the bonus game. The method can also include determining a winner of the bonus game, and providing the award to the winner.

Published US Patent Application Document No. 20080280679 (Beaupre) describes methods and systems for providing improved audio environments in relation with gaming systems. According to one embodiment, a gaming system comprises a gaming device comprising sound producing components and a sound processing system for transmitting sounds to a player based on sounds produced by the components. The sound processing system comprises a microphone; filtering means filtering the audio signal resulting from the sound capture; and outputting means outputting an audio environment based on the filtered signal. Therefore, the system provides, in real time or with a non-perceivable delay, an improved audio environment reflecting an outcome generation process. In another embodiment, a method is described comprising the steps of capturing outcome generating sounds in a signal, filtering it, and outputting an audio environment accordingly, wherein the method is performed in real time or with an non-perceivable delay. A particular embodiment is an automatic roulette device performing the present method.

U.S. Pat. No. 4,337,945 (LEVY) discloses a gaming apparatus in which a roulette wheel has a circular rim and a downwardly converging frustoconical bowl contained within the rim and joined thereto forming a track therewith for a roulette ball and a rotatable wheel head centered within the bowl at the bottom thereof and formed with a plurality of numbered compartments for receiving the roulette ball. An automatic roulette ball spinner having at least one guide tube is positioned along the rim for directing the roulette ball onto the track and is provided with a powered plunger for propelling the roulette ball through the guide tube. The guide tube is vertically moveable for lowering it onto the track to discharge the ball and then raising it to allow the ball to travel around the track uninterruptedly.

The above technologies may be incorporated into the practices of the present invention and all documents cited herein are incorporated by reference in their entirety.

SUMMARY OF THE INVENTION

A system for enabling group play for tables games selected from craps and roulette includes:

a gaming table surface configured to enable play of craps or roulette;

a processor configured to receive event outcomes from outcomes on the gaming table surface from play of craps or roulette;

multiple player input terminals distributed around the gaming table surface in an arc including more than 200 degrees around the gaming table surface;

the multiple player input terminals in two-way communication with the processor, the multiple player input terminals communicating wagers to the processor, and the processor communicating resolution of communicated wagers based on event outcomes from play of craps or roulette;

an elevated display system supported above and around the gaming table surface in an arc including more than 200 degrees around the gaming table surface; and the elevated display system showing a dynamic rendition of craps or roulette game play including at least a display of event outcomes from play of craps or roulette on which the wagers are resolved by the processor.

DETAILED DESCRIPTION OF THE INVENTION

A system for enabling group play for tables games selected from craps and roulette may include a gaming table surface configured to enable play of craps or roulette, a processor configured to receive event outcomes from game event outcomes on the gaming table surface from play of craps or roulette and multiple player input terminals distributed around the gaming table surface in an arc including more than 200 degrees around the gaming table surface. The multiple player input terminals are in two-way communication with the processor, the multiple player input terminals communicating wagers to the processor, and the processor communicating resolution of communicated wagers based on event outcomes from play of craps or roulette. There is an elevated display system supported above and around the gaming table surface in an arc including more than 200 degrees around the gaming table surface; and the elevated display system shows a dynamic rendition of craps events (e.g., tumbling dice) or roulette game play (e.g., a spinning series of roulette numbers) including at least a display of event outcomes from play of craps or roulette on which the wagers are resolved by the processor.

The system includes a preferred game of roulette, the gaming table surface being a roulette wheel and automated ball drop and automatic ball position reader in communication with the processor to communicate ball drop outcomes. In a roulette format, the gaming table surface may be a roulette wheel requiring a manually deposited ball into a spinning roulette wheel and an automatic ball drop reader in communication with the processor to communicate ball drop outcomes. The gaming system preferably has rows of the multiple player terminals distributed around the roulette wheel, and each player station has a straight line view of a display area on the elevated display system.

The gaming system may have the automatic roulette system senses the drop position of a ball in the automatic roulette system and the sensed position is identified to the processor and the processor provides signal content to the elevated display system, and the elevated display system displays the provided signal content around the gaming table surface in an arc including more than 200 degrees around the gaming table surface. In one embodiment of the gaming system, may have a bottom display area of the elevated display system is at an elevation at least 2 meters above a top of a nearest one of the multiple player terminals.

Figure 1A:
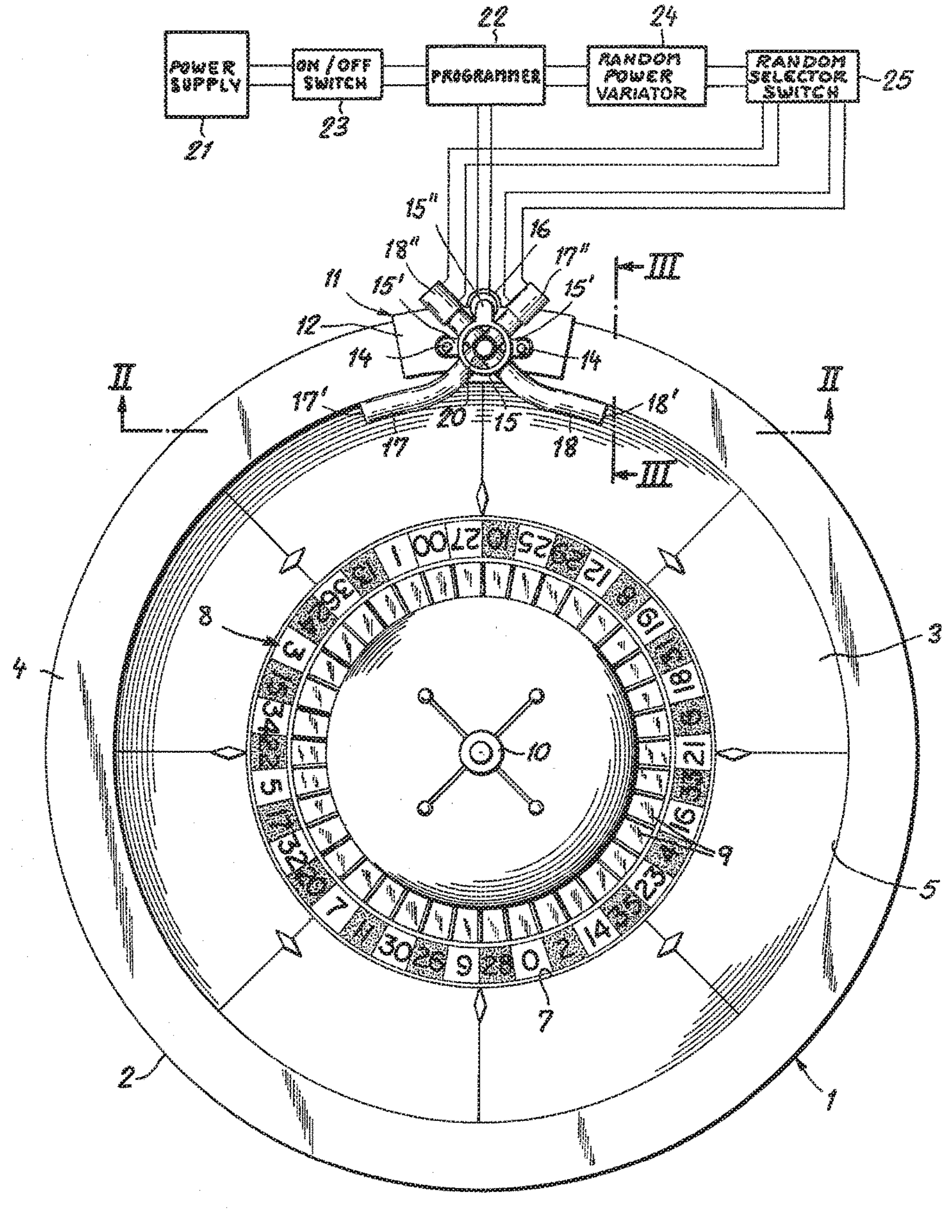
FIG.1A PRIOR ART
FIG. 1A is a top view of a prior art roulette wheel having an automatic ball spinner according to the invention.

FIG. 1A shows a roulette wheel 1 made of wood and having a circular rim 2 and a downwardly converging frustoconical bowl 3 within the rim 2 and joined thereto spaced slightly below the upper surface 4 of rim 2 to form a track 5 therewith for a roulette ball 6. The lower portion of bowl 3 has a circular opening 7 centered therein to accommodate a rotatable wheel head 8 having a series of numbered compartments 9 and a handle 10.

An automatic roulette ball spinner 11 has a C-shaped base 12 which is fitted onto the rim 2 and held in place by a screw clamp 13, which allows the ball spinner to be relocated anywhere along rim 2. Mounted on base 12 are a pair of vertical rods 14 which form vertical guides for a vertically displaceable yoke 15 having projections 15' which engage the rods 14, and a further projection 15" which is engaged by an electrically operated vertical jack 16 mounted on the base 12. A pair of guide tubes 17 and 18 are mounted in yoke 15 and intersect one another within the perimeter thereof, the tubes 17, 18 having a curvature adjacent the open ends 17' and 18' thereof conforming to the circular track 5 for guiding the balls 6 tangentially thereon. The other ends of guide tubes 17, 18 are provided with respective electrically operated plungers 17" and 18", which, as can be seen in FIG. 4, are provided with respective pistons 17'" and 18'" confronting a ball 6 which is seated within the intersection of tubes 17, 18 in a shallow recess 19, formed in the dead bottom center of the intersecting tubes.

A magazine 20, for holding a number of balls 6, is formed by a vertical tube joining the intersection of guide tubes 17, 18 and has an axis 20' on which the recess 19 is centered.

A power supply 21 is connected to a programmer 22 by way of an on/off switch 23, the programmer 22 also being connected directly to the jack 16 and to the plungers 17" and 18" by way of a random power variator 24 and a random selector switch 25. This is only one example of a prior art automatic roulette wheel that can be embedded in and used with the present invention as one enabling structure for the automatic roulette component of the present technology. This component may be fully enclosed in a see-through cover (e.g., polymeric bubble or glass enclosure).

Alternatively to the practices of the present invention, the use of a fully automated system is preferred, but not required. For example, as with some existing systems, there may be a manually operated or semi-manually operated (croupier spin wheel and drops ball which is automatically read or data entered into the processor component by the croupier through a dealer/croupier data entry terminal).

Figure 1B:
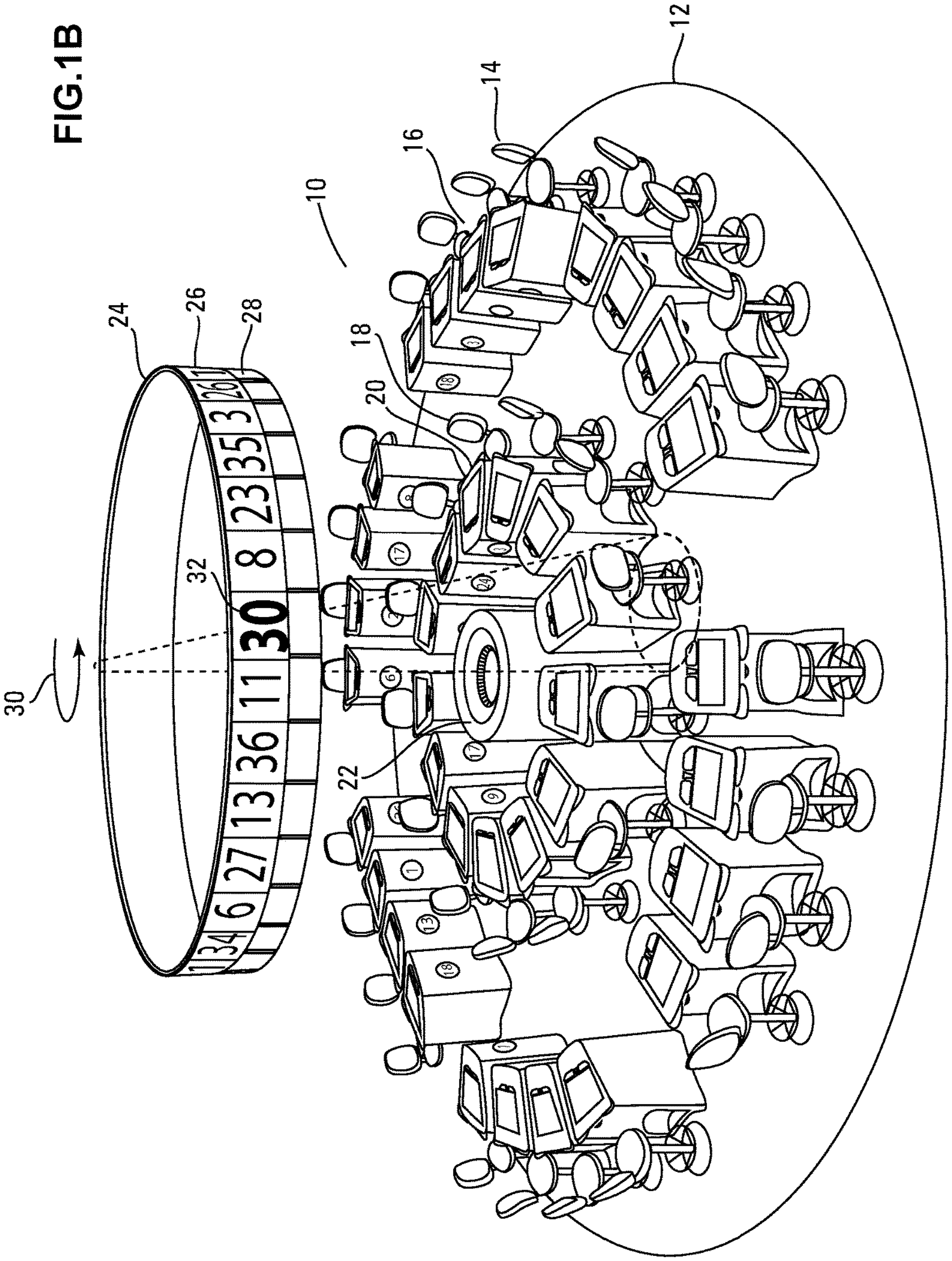
FIG. 1B shows a perspective view of an automatic gaming system within the scope of the present invention.

FIG. 1B shows a perspective view of an automatic gaming system 10 within the scope of the present invention. The automatic gaming system 10 is shown with an arena area floor 12 (which may be flat, sloped or in multiple levels with steps) having an outer ring of players' chairs 14 and associated outer ring of player input terminals 16. There is also an inner ring of players' chairs 18 with their own associated inner ring of player input terminals 20. Approximately central within the inner and outer rings of terminals 16 and 20 is a roulette wheel and ball drop 22 which is preferably automated but may be manually operated. Above the roulette wheel and ball drop 22 is an elevated display system 24 (also referred to herein as an overhead, centrally positioned display unit) which is designed to be able to display roulette gaming data at least to the outer ring of players' chairs 14 and preferably also to the inner ring of players' chairs 18. The overhead, centrally positioned display unit 24 may have a single set of display panels 26 as individual panels or as a continuous display screen, or may have two sets of display panels 26 and 28 for informational display. To assist the inner circle players to see the display of results, the lower panel 28 may be tilted more towards the floor 12 to offer a better angle of view of the lower panel 28 to the inner circle of players' chairs 18.

The information displayed on the one 26 or two 26 and 28 panels should include at least a display of the final results of the roulette ball drop event, further preferably presented as the complete set or nearly complete set of available colors and numbers in a roulette wheel (as partially shown in element 26). The entire display 24 may physically rotate (as shown by direction arrow 30 showing a counterclockwise rotation) when viewed from above (it may be clockwise also) or may virtually rotate by having the image display on the one 26 or two panels 26 and 28 present a virtual spinning wheel and associated ball drop. The ball drop event should be significantly highlighted in the display 26. The outcome number for the ball dropping on number 30 on the wheel is shown as element 32, with a virtual translucent ball or color, or expanded image or flashing image being overlaid onto the number 30. The size of the number 30 may be increased (e.g., shrinking other adjacent frames to make room for the larger 30, or by having the number 30 extend into the lower panels 28. Once the final outcome has been determined (in this case number 30 and its associated color), the entire lower set of panels 28 may display only the number 30, with its color also shown or the color shown separately. The reading of the actual outcome and its display on the overhead, centrally positioned display unit 24 should have as small a time gap between outcome and display as possible, even approaching actual real-time display. The overhead, centrally positioned display unit may also have speakers therein (not shown) so that audio signals and announcements of the results can be provided to assist the hearing impaired or just for additional entertainment value.

Reference to the additional following Figures will assist in additional understanding of the present invention.

Figure 2A:
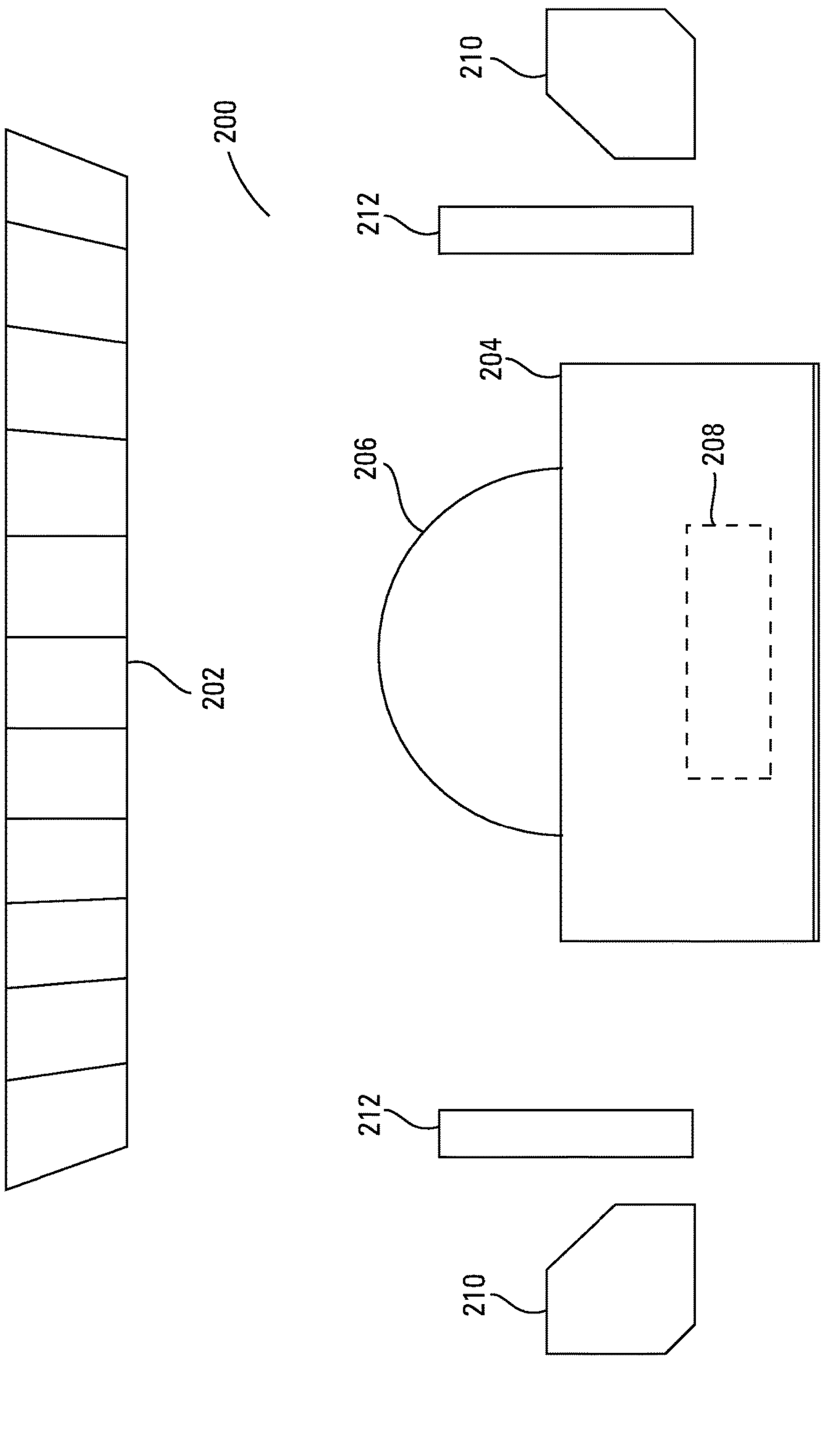
FIG. 2A shows a side view of an automatic gaming system within the scope of the present invention.
Figure 2B:
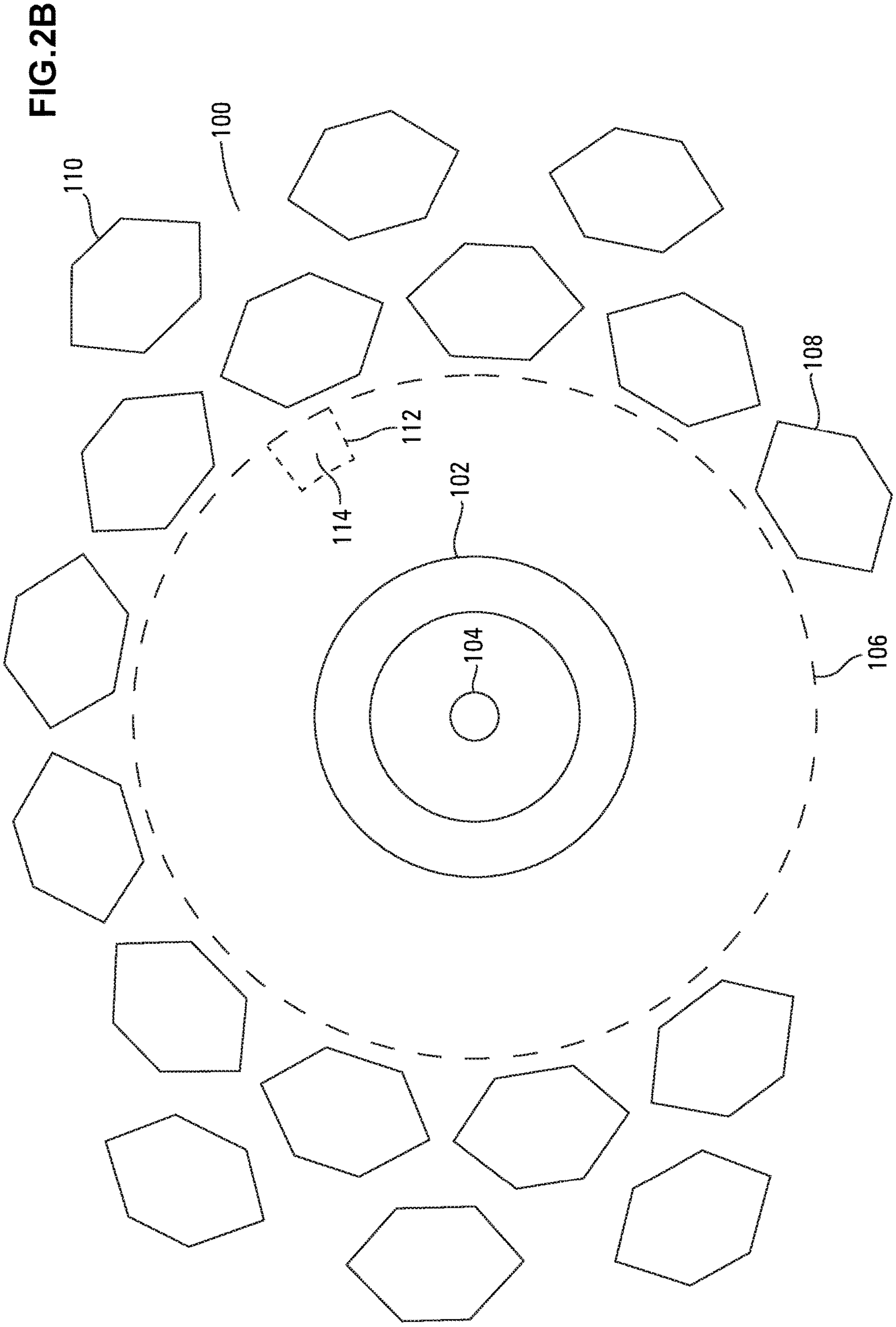
FIG. 2B shows a top view of an automatic gaming system within the scope of the present invention.

FIG. 2B shows a top view of one embodiment of the present technology. A gaming system 100 is shown with a fully automatic roulette assembly 102 in which there is a central processing unit 104. A top cover and display component 106, is positioned above the automatic roulette system 102. From this top view, it cannot be fully appreciated that the top cover and display component 106 is elevated above the automatic roulette system 102 and positioned high enough and centrally enough to be viewable by both an inner ring 108 of player wagering terminals and an outer ring 110 of player input terminals. Each of these terminals will be in communication (hard-wired or wireless linkage) with the central processing unit 104, and will have a display screen and player input components (buttons, touchscreen, voice recognition, and/or the like). The processor will be in two-way communication with the fully automatic roulette system 102 to both place wagers, and receive game event outcomes from the automatic roulette 102 system that are communicated back to the two rings 108 110 of player terminals to implement wagering outcomes.

FIG. 2B shows a side view of a wide area gaming system 200 according to one embodiment of the invention. A fully automatic gaming system 204 (for enabling craps or roulette gaming events) is shown with a fully enclosing transparent bubble cover 206 and a central processor 206. The automatic gaming system 204 is shown in a central location with respect to individual player seats 210 and input terminals 212. The processor transmits gaming outcome content to both the individual player terminals 212 and to the overhead, centrally positioned display unit 202 having a display perimeter 214. The display perimeter 214 may be continuous screen, connected screen segments or independent screen segments capable of displaying game outcome effects, For example, using roulette gaming events for purposes of illustration, the display perimeter may have individual segments or the continuous field simulate the canoes/slots on a roulette wheel with the numbers of the wheel being displayed, in rotational mode for example, with virtual speed varying to simulate speed variations on a physical roulette wheel. The virtual appearance of a drop ball may be overlaid on the screens, and when the actual ball drop occurs, the virtual ball is shown as an image on the screen on the event outcome number (e.g., a white ball over the number or a white translucent number over the number so that it is viewable through the ball. The virtual wheel on the overhead display 202 and the individual segment 214 may rotate slowly (mimicking a physical roulette wheel) and/or may stop completely and every segment (viewable by an array of surrounding player stations, chairs and terminals) can be either the entire wheel displayed with the one winning outcome displayed or the single winning outcome can be displayed distributed around the entire circumference of the overhead display 202. The same white ball on number symbol may be displayed in all or some of the segments to assure ease of viewing the outcome from each and every player terminal.

As shown in FIG. 2A, the display surface 216 may be sloped to provide a better angle of vision 218 to nearest arrays of player seating 210 in front of the player input terminals 212. The line of sight between outer arrays of player input terminals (not shown in FIG. 2A, but see 110 in FIG. 2) would be even a larger angle away from horizontal between a center of the overhead display 202 and a center of the automatic gaming system 204. The outer array of player input terminals 110 (FIG. 2) may be on a same horizontal surface as the inner array 108, or may be on a higher surface (forming a pit with the automatic gaming system 102 204 on the lowest level), and/or may be on a lower level (placing the automatic gaming system 102 204 on a mound position elevated above at least some outer player input terminals 110).

The above described generic invention may include additional and alternative features within the scope of the present technology. For example, the bubble cover 206 may include a holographic display system for the outcomes, with suspended particles in the interior of the transparent/translucent bubble cover 206 supporting laser projected holographic images of the outcomes and/or wheels. Alternatively, the interior surface of the bubble may have light absorbing characteristics that would support light displays on the surface of the bubble cover 206. The overhead display or environmental acoustics can support a sound system (speakers) so that in addition to the visual overhead display, an audio announcement of game outcomes can be provided, Alternative terminals, alternative automated craps and roulette systems within the total system of the present invention may also be used. The Overhead display system may also indicate (in addition to the single number/color output random event) specific other wagering outcomes. For example, if a player has made a wager on side bets with repeated numbers, consecutive numbers, consecutive colors, etc., either the same line/circumference of displayed wagers on the display perimeter 214 may also contain this information, or a set of sub-panels for display directly underneath the primary displayed numbers on the display perimeter 214 may also be provided. The location of any highly successful wagering events or streaks may also be identified on the overhead display. This is especially beneficial in systems where players may place wagers on positions of other players, or on groups or sections of players.

For example, rather than a standard wagering tree showing a history of individual outcomes on the underlying game, the system may report specific player results, specific groups or areas (e.g., quadrant 3, or segment 9/10, or segment 3/10 row 2 of the array of player input terminals) and the system will allow any player to place wagers on what is perceived to be terminal(s) where significant success is being achieved. The individual terminals may therefore have the capability (by buttons, touchscreens and/or specific software) to place such systemic wagers. This would require a networked (hardwired or wireless) connection to the central game processor to account for and resolve such individual position wagers on other locations within the array of player terminals associated with the overhead display.

The underlying technology may have other features that act in concert with the underlying technology to offer additional benefits or improvements. The audio system may project sounds of the ball bouncing along the ribs between openings in the wheel, the panels on the display system may tilt (up and down) and/or twist (left and right rotations) to enhance the ability of the display to be viewed by all players. Where the displays are digital images, the displays of winning outcomes may expand across natural dimensions of individual panels to make the winning outcome appear larger. The displays may "flash" with different colors and/or different sizes and sounds. The display panels may also be raised and lowered with respect to its relative height from the floor and distance from the ceiling.

Imagery for the display system would be stored in memory associated with the display system processor or other accessible storage medium that is accessed by the game controller/main processor during gaming. Additional imagery, such as advertising, number tracking, time and date, may also be displayed.

What is claimed:

1. A system for enabling group play for tables games selected from craps and roulette comprising:

a gaming table surface configured to enable play of craps or roulette;

a processor configured to receive event outcomes from outcomes on the gaming table surface from play of craps or roulette;

multiple player input terminals distributed around the gaming table surface in an arc including more than 200 degrees around the gaming table surface;

the multiple player input terminals in two-way communication with the processor, the multiple player input terminals communicating wagers to the processor, and the processor communicating resolution of communicated wagers based on event outcomes from play of craps or roulette;

an elevated display system supported above and around the gaming table surface in an arc including more than 200 degrees around the gaming table surface, the elevated display physically rotating above the multiple player input terminals and presenting a virtual indication of a ball drop outcome; and the elevated display system showing a dynamic rendition of craps or roulette game play including at least a display of event outcomes from play of craps or roulette on which the wagers are resolved by the processor.

2. The system of claim 1 wherein the table game is roulette, the gaming table surface comprising a roulette wheel and automated ball drop and automatic ball position reader in communication with the processor to communicate ball drop outcomes to the elevated display.

3. The gaming system of claim 1 wherein the table game is roulette, the gaming table surface comprising a roulette wheel requiring a manually deposited ball into a spinning roulette wheel and an automatic ball drop reader in communication with the processor to communicate ball drop outcomes to the elevated display.

4. The gaming system of claim 2 wherein there are rows of the multiple player terminals completely surrounding the elevated display distributed around the roulette wheel, and each player station has a straight line view of a display area on the elevated display system.

5. The gaming system of claim 4 wherein the automatic roulette system senses the drop position of a ball in the automatic roulette system and the sensed position is identified to the processor and the processor provides signal content to the elevated display system, and the elevated display system displays the provided signal content by physically rotating the display or having an image virtually rotate around the gaming table surface in an arc including more than 200 degrees around the gaming table surface.

6. The gaming system of claim 4 wherein a bottom display area of the elevated display system is at an elevation at least 2 meters above a top of a nearest one of the multiple player terminals.

7. The gaming system of claim 5 wherein a bottom display area of the elevated display system is at an elevation at least 2 meters above a top of a nearest one of the multiple player terminals.

8. A method of executing a wagering event comprising: performing a random ball drop event on a roulette wheel comprising:

executing a roulette gaming event on a gaming table surface configured to enable play of roulette;

a processor receives random event outcomes from outcomes on the gaming table surface from play of roulette on the gaming table surface;

a player input terminal included within multiple player input terminals distributed around the gaming table surface in an arc including more than 200 degrees around the gaming table surface places a wager on a random event outcome from play of roulette on the gaming table surface;

the player input terminal operates in two-way communication with the processor, the player input terminals communicating a wager to the processor, and the processor communicating resolution of the communicated wager based on event outcomes from play of roulette on the gaming table surface;

an elevated display system supported above and around the gaming table surface in an arc including more than 200 degrees around the gaming table surface is in communication with the processor, the elevated display physically rotating the elevated display above the multiple player input terminals showing a dynamic rendition of a roulette game play event including at least a display of event outcomes from play of roulette on which the wagers are resolved by the processor.

9. The method of claim 8 wherein the gaming table surface comprises a) a roulette wheel and automated ball drop and b) an automatic ball position reader in communication with the processor to communicate ball drop outcomes as a wagering event outcome to the elevated display.

10. The method of claim 8 wherein the gaming table surface comprises a roulette wheel on which a ball is manually deposited ball into a spinning roulette wheel and an automatic ball drop reader communicates with the processor to communicate ball drop outcomes as a wagering event outcome to the elevated display.

11. The method of claim 9 wherein there are rows of the multiple player terminals distributed around the roulette wheel, and each player station including the player station placing the wager has a straight line view of a display area on the elevated display system by physically rotating or having an image virtually rotate above the multiple player terminals.

12. The method of claim 11 wherein the automatic roulette system senses the drop position of a ball in the automatic roulette system and the sensed position is identified to the processor and the processor provides signal content to the elevated display system, and the elevated display system displays the provided signal content around the gaming table surface in an arc including more than 200 degrees around the gaming table surface system by physically rotating the elevated display or having an image virtually rotate above the multiple player terminals.

13. The method of claim 11 wherein a bottom display area of the elevated display system is at an elevation at least 2 meters above a top of a nearest one of the multiple player terminals.

14. The method of claim 12 wherein a bottom display area of the elevated display system is at an elevation at least 2 meters above a top of a nearest one of the multiple player terminals.

15. The method of claim 9 wherein the elevated display system provides an image of all virtual numbers of a roulette wheel, and at a conclusion of ball drop outcomes as a wagering event outcome, a virtual ball drop indication is provided on a number that is part of the ball drop outcome as the wagering event outcome on the elevated display system, and the result is displayed on the elevated display by physically rotating or having an image virtually rotate above the multiple player terminals.

16. The method of claim 15 wherein the elevated display shows revolving roulette numbers and speed of the revolving roulette numbers diminishes as the ball drop outcome occurs on the gaming table surface.

17. The method of claim 16 wherein the elevated display system has a display surface having a lowest portion of the display surface that is tilted inwardly towards a center of the gaming table surface and away from furthest of the multiple player input stations.

* * * * *